United States Patent [19]
Kaneda et al.

[11] Patent Number: 6,016,221
[45] Date of Patent: Jan. 18, 2000

[54] IMAGE-SHAKE PREVENTING DEVICE

[75] Inventors: Naoya Kaneda; Hironori Takano, both of Kanagawa-ken, Japan

[73] Assignee: Canon Kabushiki Kaisha, Tokyo, Japan

[21] Appl. No.: 08/870,021

[22] Filed: Jun. 5, 1997

Related U.S. Application Data

[63] Continuation of application No. 08/122,661, Sep. 17, 1993, abandoned.

[30] Foreign Application Priority Data

Sep. 21, 1992 [JP] Japan .................................. 4-274848
Oct. 16, 1992 [JP] Japan .................................. 4-278721

[51] Int. Cl.$^7$ .............................. G02B 27/64; G03B 7/08
[52] U.S. Cl. .......................... 359/557; 359/554; 396/52
[58] Field of Search .................................. 359/554–557, 359/813, 823, 694–706; 354/400, 408, 195.1–195.12, 70, 430; 396/52, 55; 348/202, 208

[56] References Cited

U.S. PATENT DOCUMENTS

| | | | |
|---|---|---|---|
| 4,615,590 | 10/1986 | Alvarez et al. | 359/556 |
| 4,970,540 | 11/1990 | Vasey et al. | 359/554 |
| 5,107,293 | 4/1992 | Sekine et al. | 359/554 |
| 5,172,150 | 12/1992 | Teramoto et al. | 359/554 |
| 5,231,445 | 7/1993 | Onuki et al. | 354/70 |
| 5,243,462 | 9/1993 | Kobayashi et al. | 359/557 |
| 5,398,132 | 3/1995 | Otani | 359/557 |

FOREIGN PATENT DOCUMENTS 62-277860  12/1987  Japan .

*Primary Examiner*—Thong Nguyen
*Attorney, Agent, or Firm*—Fitzpatrick, Cella, Harper & Scinto

[57] ABSTRACT

An image-shake preventing device or an optical axis deflecting device includes a lock part arranged to lock a movable optical member when the state of a barrier member comes to block incident light and when the position of a photo-taking optical system is either outside of a normal shooting area or in the neighborhood of a wide-angle end position. This arrangement obviates the necessity of providing the device with any operation part, a driving part, etc., solely for the purpose of locking the movable optical member and thus permits reduction in size and cost of the device. When the movable optical member must be locked, the arrangement also enables the device to adequate lock the movable optical member.

16 Claims, 17 Drawing Sheets

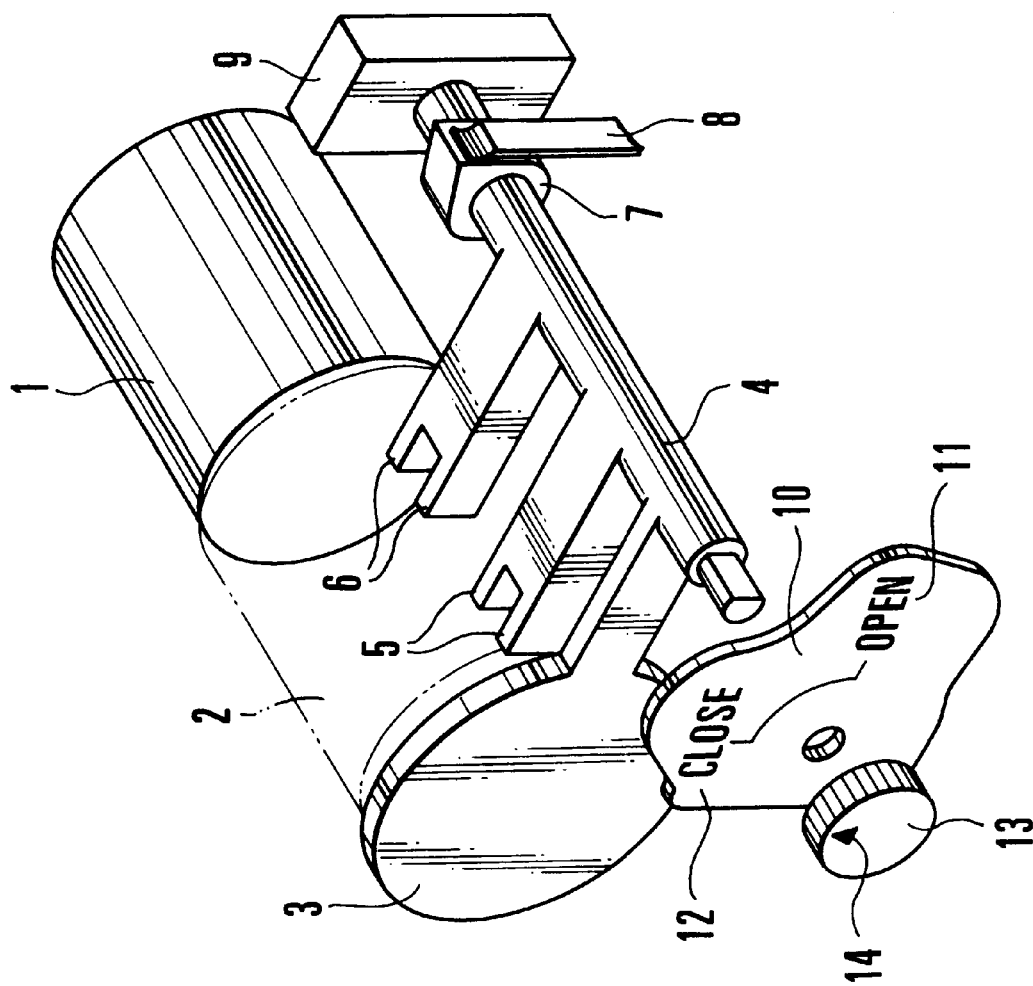

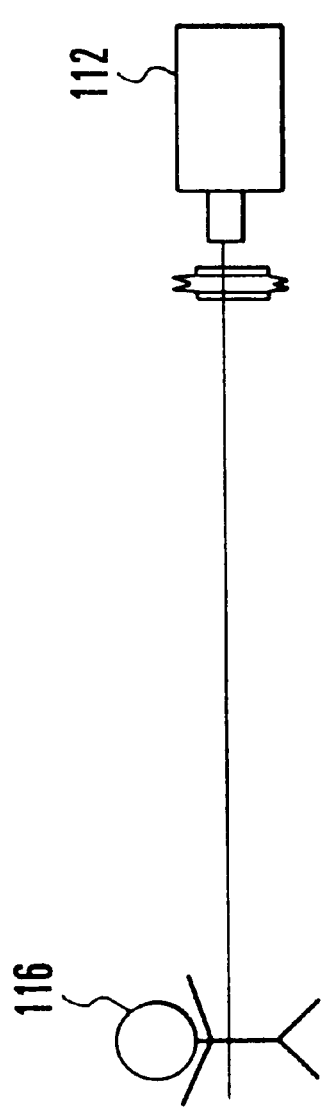
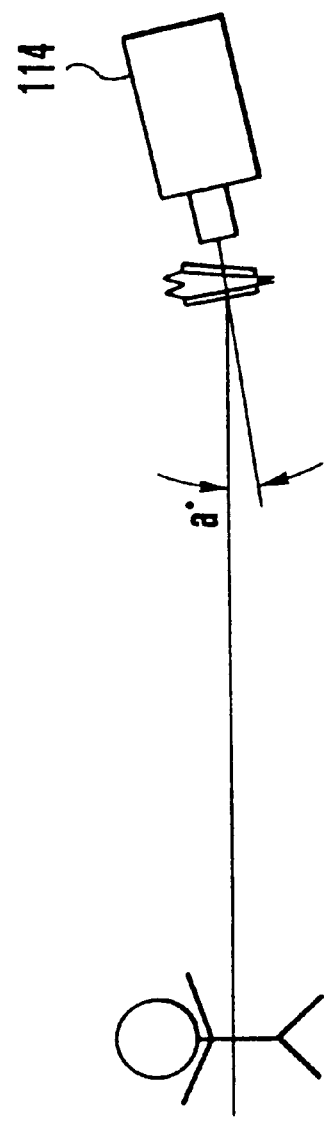
FIG. 17(A) PRIOR ART
FIG. 17(B) PRIOR ART

IMAGE-SHAKE PREVENTING DEVICE

This application is a continuation of application Ser. No. 08/122,661 filed Sep. 17, 1993, now abandoned.

BACKGROUND OF THE INVENTION

1. Field of the Invention

This invention relates to an image-shake preventing device having correcting optical means such as a variable angle prism or the like.

2. Description of the Related Art

As a result of the recent advancement of automation of shooting apparatuses such as still cameras and video cameras, functions of varied kinds have been practicalized including, among others, automatic exposure adjustment means and automatic focusing means. In the field of video cameras, it is generally practiced to use a zoom lenses as a photo-taking lens. The zoom ratio of zoom lenses has been increasing year after year.

Meanwhile, efforts to reduce the size of the shooting apparatuses are showing salient results. The art of actually arranging a pickup image plane in a smaller size and in higher density has advanced. Various chassis have been developed for use with mechanisms of compact video recorders. As a result of these efforts, some of the recent products of shooting apparatuses have come to permit a shooting operation using one hand.

However, in operating such a compact video camera having a zoom lens, the vibration of the hand of the camera operator tends to cause an image shake to appear on the image plane. To obtain a stable image by eliminating such an image shake, various image-shake preventing devices have been proposed. These image-shake preventing devices not only eliminate the serious image shake due to the vibration of hands but, of course, also give a great advantageous effect even in a case where the image shake cannot be eliminated by the use of a tripod, like in the case of shooting on board of a ship or in a moving car.

Each of these image-shake preventing devices is composed at least of vibration detecting means for detecting a vibration and image-shake correcting means for making a correction according to information on the detected vibration so as to prevent an image shake from occurring on an image plane.

The vibration detecting means has been selected from among a group consisting of an angular acceleration meter, an angular velocity meter, an angular displacement meter, etc. As for the image-shake correcting means, either a variable angle prism is used in a manner as will be described in detail later herein or, in the case of a video camera in which a specific area of a pickup image plane is cut out from information on the pickup image plane and actually used as an image plane, the cutting out position of the area is arranged to be shifted to other positions where an image shake can be corrected one after another in such a manner as to track the image shake.

Hereinafter, the former image-shake correcting method of using optical means such as the above-stated variable angle prism for removal of an image shake in the stage of forming an image on an image sensor will be called "optical correcting means". The latter image-shake correcting method of removing an image shake through an electronic processing action on image information including the image shake hereinafter will be called "electronic correcting means".

Generally, the optical correcting means is capable of correcting an image shake resulting from a vibration taking place within a certain range of angles determined as an angular range of camera vibrations irrespective of the focal length of the lens of the camera. Therefore, even in the case a zoom lens having a long focal length on its telephoto side, the image-shake removing performance of the optical correcting means presents no problem for actual applications. The use of the optical correcting means, however, results in an increase in the size of the camera.

In the case of the electronic correcting means, on the other hand, the rate of correction on the image plane with respect to, for example, the vertical dimension of the image plane is fixed. Therefore, the image-shake preventing performance degrades accordingly as the focal length on the telephoto side increases. However, in many cases, the electronic correcting means is advantageous for reduction in the size of the camera.

FIGS. 15(A), 15(B), and 15(C) show a relation of the angle of vibration of a camera to the focal length through the position of an object image on an image plane.

Referring to FIG. 15(A), a lens has an optical axis 113 when the camera is in a position 112. In this case, the lens is directed to about the middle part of a person 111 which is an object of shooting. When, for example, the camera is caused to turn an angle of degrees "a" by the vibration of a hand, the camera comes to a position 114 where the lens has an optical axis 115.

FIGS. 15(B) and 15(C) indicate the positions of an image plane obtained respectively when the camera is in the positions 112 and 114. FIG. 15(B) shows a state obtained when a zoom lens is at its telephoto end position and FIG. 15(C) a state obtained when the zoom lens is at its wide-angle end position. An object image 116 is on an image plane. Image planes 117 and 119 are obtained when the camera is in the position 112. Image planes 118 and 120 are obtained when the camera is in the position 114.

As apparent from FIGS. 15(A), 15(B) and 15(C), with the camera vibrated at the same angle of degrees "a", the image is damaged by an image shake to a greater extent when the focal length of the zoom lens is longer. In a case where image-shake correcting means is to be arranged in combination with a lens having a long focal length at its telephoto end position, therefore, the use of the optical correcting means such as a variable angle prism is more advantageous than the electronic correcting means.

FIGS. 16(A), 16(B), and 16(C) show the arrangement of a variable angle prism. Referring to FIG. 16(A), reference numerals 121 and 123 denote glass plates. A bellows part 127 is made of a polyethylene material or the like. A transparent liquid 122 which is a silicone oil or the like is placed and sealed within a space encompassed with the glass plates 121 and 123 and the bellows part 127. In FIG. 16(B), the two glass plates 121 and 123 are shown in a parallel state. In this state, the incident angle and the exit angle of each ray of light incident on and exiting from the variable angle prism are equal to each other. However, when the two glass plates 121 and 122 are slanting at an angle to each other as shown in FIGS. 16(A) and 16(C), the ray of light is bent at some angle as indicated by lines 124 and 126.

Therefore, in a case where the camera is slanted by a vibration of the hand or the like, an image shake can be eliminated by controlling the angle of the variable angle prism which is disposed in front of the lens in such a way as to bend rays of light as much as the slanting angle.

FIGS. 17(A) and 17(B) show the state of such a control. In the case of FIG. 17(A), the two glass plates are in parallel with each other and a photo-taking optical axis is assumed to be directed to the head of the object. In the event of a vibration at an angle of degrees "a", the rays of light are bent, by driving the variable angle prism, an angle corresponding to the vibration, so that the optical axis can be kept directed to the head of the object, as shown in FIG. 17(B).

FIG. 18 shows by way of example a practicable arrangement of the variable angle prism which is provided with an actuator part arranged to drive the variable angle prism and an apex angle sensor arranged to detect the angular position of the variable angle prism.

Since actual variations take place in every direction. Each of front and rear glass surfaces is arranged to be rotatable on rotation axes which are in directions deviating 90 degrees from each other. All the component parts which are arranged in one of the two different rotating directions and indicated by reference numerals suffixed by "a" are arranged to function in the same manner as the functions of the component parts which are arranged in the other rotating direction and indicated by reference numerals suffixed by "b".

Referring to FIG. 18, the variable angle prism 141 consists of glass plates 121 and 123, a bellows part 127, a liquid 122, etc. The glass plates 121 and 123 are attached with an adhesive or the like respectively to holding frames 128a and 128b. The holding frames 128a and 128b respectively have rotation axes 133a and 133b in conjunction with fixed parts (not shown) and are thus arranged to be turnable around these axes 133a and 133b. The directions of these axes 133a and 133b differ 90 degrees from each other. On each of the holding frames 128a and 128b, a coil such as 135a or a corresponding element hidden from view is arranged in one body with the frame. Meanwhile, in a fixed part which is not shown, there is arranged a magnet such as 136a or a corresponding magnet hidden from view and yokes such as 137a or a corresponding yoke hidden from view and 138a or a corresponding yoke hidden from view. The arrangement is such that, when a current is allowed to flow to the coil 135a or the corresponding coil hidden from view, the variable angle prism 141 turns around the axis 133a or 133b. A slit 129a or a corresponding second slit hidden from view 129b is provided in the fore end of an arm part such as 130a or a corresponding arm part hidden from view which is formed in one body with the holding frame 128a or the corresponding holding frame hidden from view and extends from the holding frame 128a or the corresponding holding from hidden frame view. This slit 129a or the corresponding slit hidden from view is arranged to form an apex angle sensor in conjunction with a light emitting element such as 131a or a corresponding light emitting element hidden from view which is an infrared-emitting diode (IRED) or the like disposed on a fixed part and a light receiving element such as 142a or a corresponding light receiving element hidden from view which is a PSD (photosensitive diode) or the like.

FIG. 19 is a block diagram showing an image-shake preventing device which includes the above-stated variable angle prism 141 as image-shake correcting means and is arranged in combination with a lens.

Referring to FIG. 19, the illustration includes the variable angle prism 141, apex angle sensors 143 and 144, amplifier circuits 153 and 154 which are arranged to amplify respectively the outputs of the apex angle sensors 143 and 144, a microcomputer 145, vibration detecting means 146 and 147 respectively including angular accelerometers, etc., a lens 152, and actuators 148 and 149 each of which consists of the above-stated parts from the coil 135a or the corresponding coil hidden from view to the yoke 138a or the corresponding yoke hidden from view.

The microcomputer 145 is arranged to determine currents to be applied to the actuators 148 and 149 in controlling the variable angle prism 141 to an optimum angle position for removal of an image shake according to angle positions detected by the apex angle sensors 143 and 144 and the results of detection made by the vibration detecting means 146 and 147. In the arrangement shown in FIG. 19, each of the essential elements is shown in two blocks, because the control actions to be performed in the two different directions deviating 90 degrees are assumed to be carried out independently of each other.

The image-shake preventing device of the kind using the variable angle prism has been described above.

With the image-shake preventing device including such an optical correcting means that is arranged to move the variable angle prism and a part or the whole of an phototaking lens, when the supply of currents to the actuators such as the coil 135a of FIG. 18 is cut off, for example, by turning off the main power supply of the camera, these actuators lose their powers for holding the variable angle prism or the movable lens within its movable range. Each of these moving parts then comes to a stop in a dynamically balanced position. However, this brings about the following problems:

(i) When an impact or vibration is applied from outside, the variable angle prism or the moving lens moves within its movable range. Then, if the moving extent is large, either an abnormal sound or a damage might be caused by a mechanical collision with a part located at a moving end.

(ii) With the variable angle prism used as the image-shake correcting means, the weight of the inside liquid might cause the two glass plates 121 and 123 which jointly form the variable angle prism as shown in FIGS. 16(A), 16(B) and 16(C) to become unable to keep their parallel state and to come to have some angle relative to each other. If the glass plates 121 and 123 are left in this state of having some angle either over a long period of time or under a high temperature and/or high humidity condition, the dynamic characteristic of the image-shake correcting means would be deteriorated.

To solve these problems, it is conceivable to keep a moving correcting optical member such as the variable angle prism or the moving lens approximately in the middle of their movable ranges by arranging a DC motor to transmit its driving force to a lever in association with the operation of the power supply. However, this arrangement necessitates the provision of a motor as an additional drive source solely for the purpose of moving a lever which is arranged to hold the optical correcting member approximately in the middle of its movable range. The use of such an additional drive source is undesirable in terms of reduction in size and energy saving.

SUMMARY OF THE INVENTION

In accordance with one aspect of this invention, there is provided an image-shake preventing device or an optical axis deflecting device including, in combination, image-shake correcting optical means for correcting an image shake by moving within an optical path or an optical member arranged to deflect an optical axis of passing light, setting means for setting the device in an inoperative state, and lock means for locking the image-shake correcting optical means or the optical member in association with the setting means. This arrangement permits reduction in size and cost by obviating the necessity of providing an operation part, a driving part, etc., solely for the locking action.

In accordance with another aspect of this invention, the setting means in the above-stated arrangement is arranged to be a barrier member or moving means for moving an optical system. That arrangement enables the locking action to be adequately carried out when the device is in a state of requiring the locking action.

In accordance with a further aspect of this invention, an image-shake preventing device or an optical axis deflecting device is arranged to include, in combination, image-shake correcting optical means for correcting an image shake by moving within an optical path or an optical member arranged to deflect an optical axis of passing light, and lock means for locking the image-shake correcting optical means or the optical member in association with the movement of an optical system. This arrangement permits reduction in the size and cost of the device by obviating the necessity of providing an operation part, a driving part, etc., solely for the purpose of the locking action.

In accordance with a still further aspect of this invention, the lock means included in the above-stated arrangement is arranged to perform the locking action when the position of the optical system in the neighborhood of a wide-angle end position. The arrangement enables the locking action to be adequately carried out when the device is in a state of requiring the locking action.

The above and further aspects and features of this invention will become apparent from the following detailed description of embodiments thereof taken in connection with the accompanying drawings.

BRIEF DESCRIPTION OF THE DRAWINGS

FIG. 1 is an oblique view showing a mechanism for interlocking a lens barrier and a variable-angle-prism holding member in a first embodiment of this invention.

FIGS. 17(A) and 17(B) show the function of the variable angle prism shown in FIGS. 16(A) to 16(C).

DETAILED DESCRIPTION OF THE PREFERRED EMBODIMENTS

First Embodiment

Figure 2A:
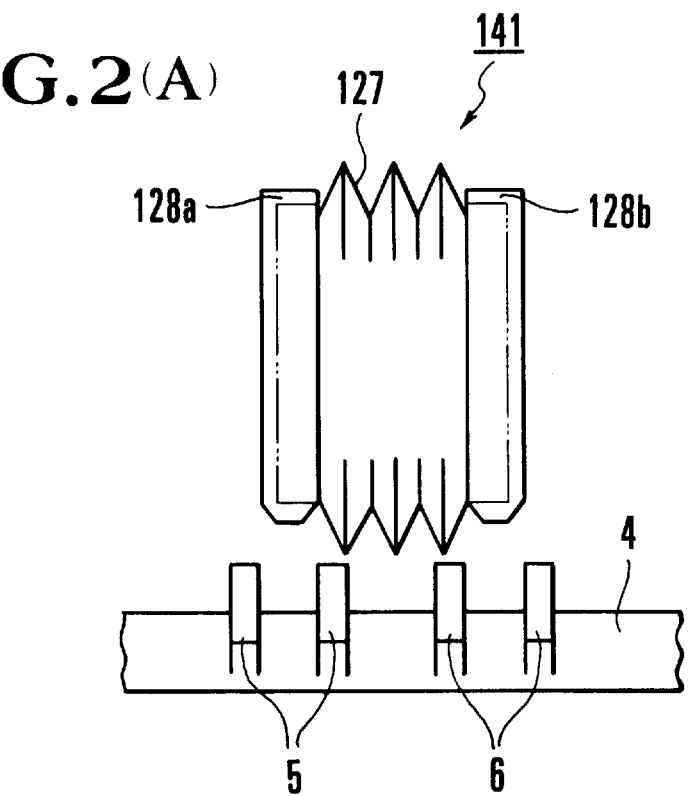
FIGS. 2(A) and 2(B) show the holding member of FIG. 1 in a state of not holding a variable angle prism and in a state of holding the variable angle prism.
Figure 2B:
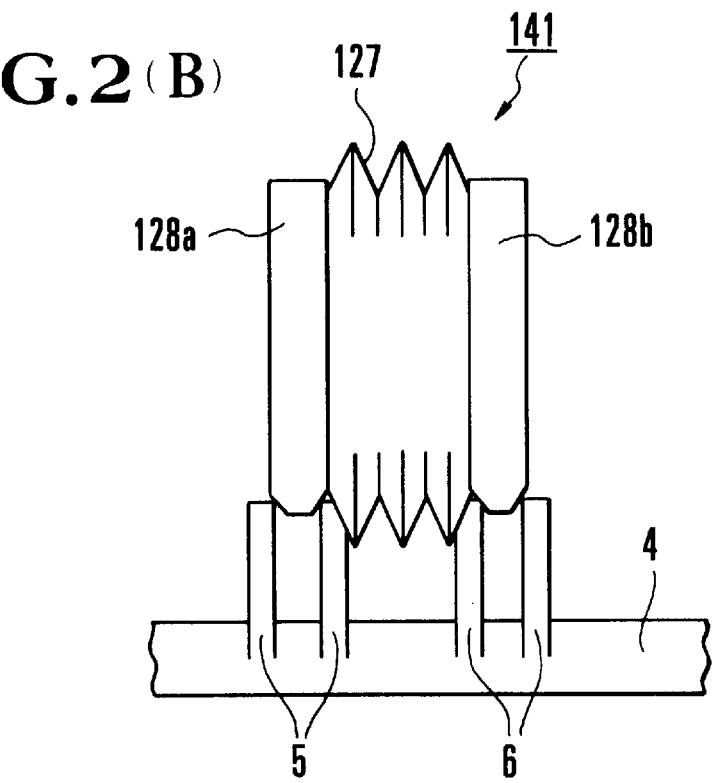

FIGS. 1, 2(A), and 2(B) show a first embodiment of this invention. In FIG. 1, there are illustrated a photo-taking lens 1, optical image-shake correcting means 2 including, for example, a variable angle prism, a lens barrier part 3 arranged to block an optical path, a rotation shaft 4 arranged in one body with the lens barrier part 3, holding claws 5 and 6 arranged in one body with the lens barrier part 3 and the rotation shaft 4 to act as holding means, a cam 7, and a leaf spring 8. The cam 7 and the leaf spring 8 are arranged in combination to stably keep the rotation shaft 4 in either of two positions where an index 14 comes to point words "OPEN" and "CLOSE" as will be described later herein. A bearing part 9 is stationary. A cover part 10 is provided with printed or carved marks 11, 12, etc., indicating "OPEN", "CLOSE", etc. A knob 13 is arranged in one body with the rotation shaft 4 across the cover part 10. The index 14 is marked on the knob 13 by printing or carving. The knob 13 is arranged such that the lens barrier part 3 and the holding claws 5 and 6 can be turned together by turning the knob 13.

As apparent from FIG. 1, the lens barrier part 3 can be moved between an optical-path closing position (hereinafter referred to as the closed position) and an optical-path opening position (hereinafter referred to as the open position) by turning the knob 13. Referring next to FIGS. 2(A) and 2(B), an arrangement for holding the variable angle prism by turning the holding claws 5 and 6 is described as follows:

FIG. 2(A) shows the holding claws 5 and 6 in a state of not holding the variable angle prism 141. In this instance, the lens barrier part 3 which is not shown is also in an open position. When the knob 13 is turned from this position to bring the lens barrier part 3 into a closed position as shown in FIG. 2(B), each of the holding frames 128a and 128b of the variable angle prism 141 is inserted in between the holding claws 5 or the holding claws 6 to be held by these claws. Conversely, when the position of the lens barrier part 3 is shifted from the closed position to its open position, the holding claws 5 and 6 which have been holding the holding frames 128a and 128b of the variable angle prism 141 cancel their holding actions by moving away from the holding positions.

Figure 3:
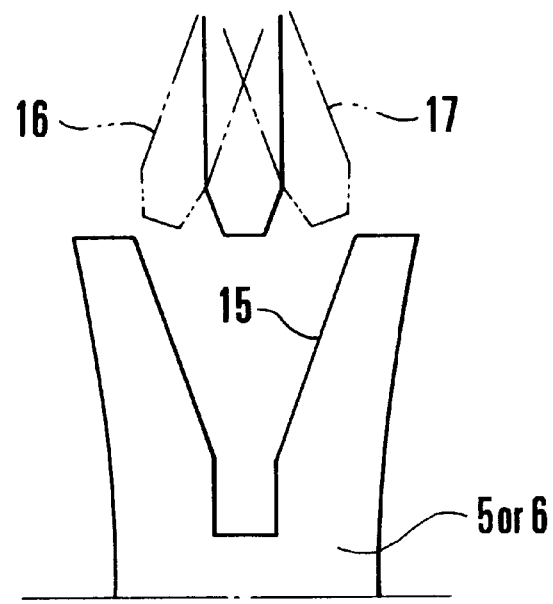
FIG. 3 shows by way of example the fore end shape of the holding member of FIG. 1.

In actuality, the position of the holding frame 128a or 128b of the variable angle prism 141 is not always in a position where it should be kept (about middle of the movable range) and might be in a deviating position 16 or 17 as shown in FIG. 3. In view of this, the holding claws 5 or 6 are preferably formed to have tapered parts 15 in their fore end parts, as shown in FIG. 3, in such a way as to guide the holding frame 128a or 128b into a part between them irrespective of the deviating position.

Second Embodiment

The tapered parts 15 provided at the fore ends of the holding claws of the first embodiment for guiding in the holding frame 128a or 128b, as shown in FIG. 3, causes an increase in space required and might be hardly practicable in some cases. The second embodiment is arranged to solve this problem.

In the case of the second embodiment, a detecting means is arranged to detect the movement of a lens barrier. In response to detection by the detecting means that the lens barrier is closed, driving means brings a correcting optical member such as a variable angle prism to a holding position. After that, a holding member holds the correcting optical member in the holding position. The image-shake correcting action and the arrangement for this action of the second embodiment is similar to the action and the arrangement of the conventional device shown in FIGS. 15(A) to 19. The holding mechanism of a holding member of the second embodiment is similar to that of the first embodiment shown in FIGS. 2(A) and 2(B). The following describes the second embodiment, therefore, with reference to FIG. 19 which shows the conventional device and FIGS. 2(A) and 2(B) which show the first embodiment, in addition to FIGS. 4, 5 and 6 which show the features of the second embodiment.

Figure 4:
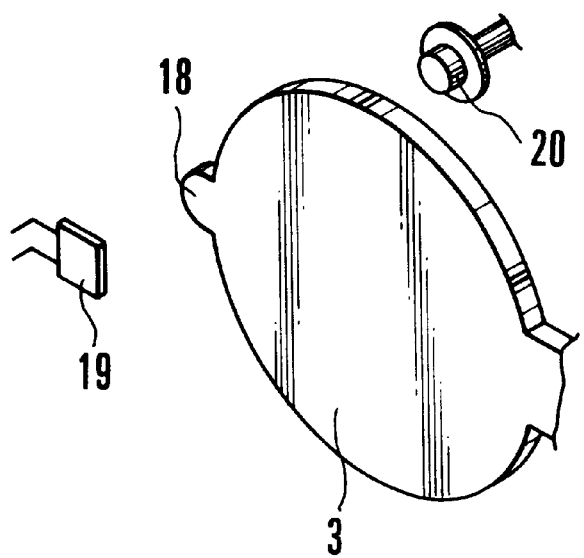
FIG. 4 is an oblique view showing in outline the arrangement of a sensor arranged to detect the movement of a lens barrier in a second embodiment of this invention.
Figure 5:
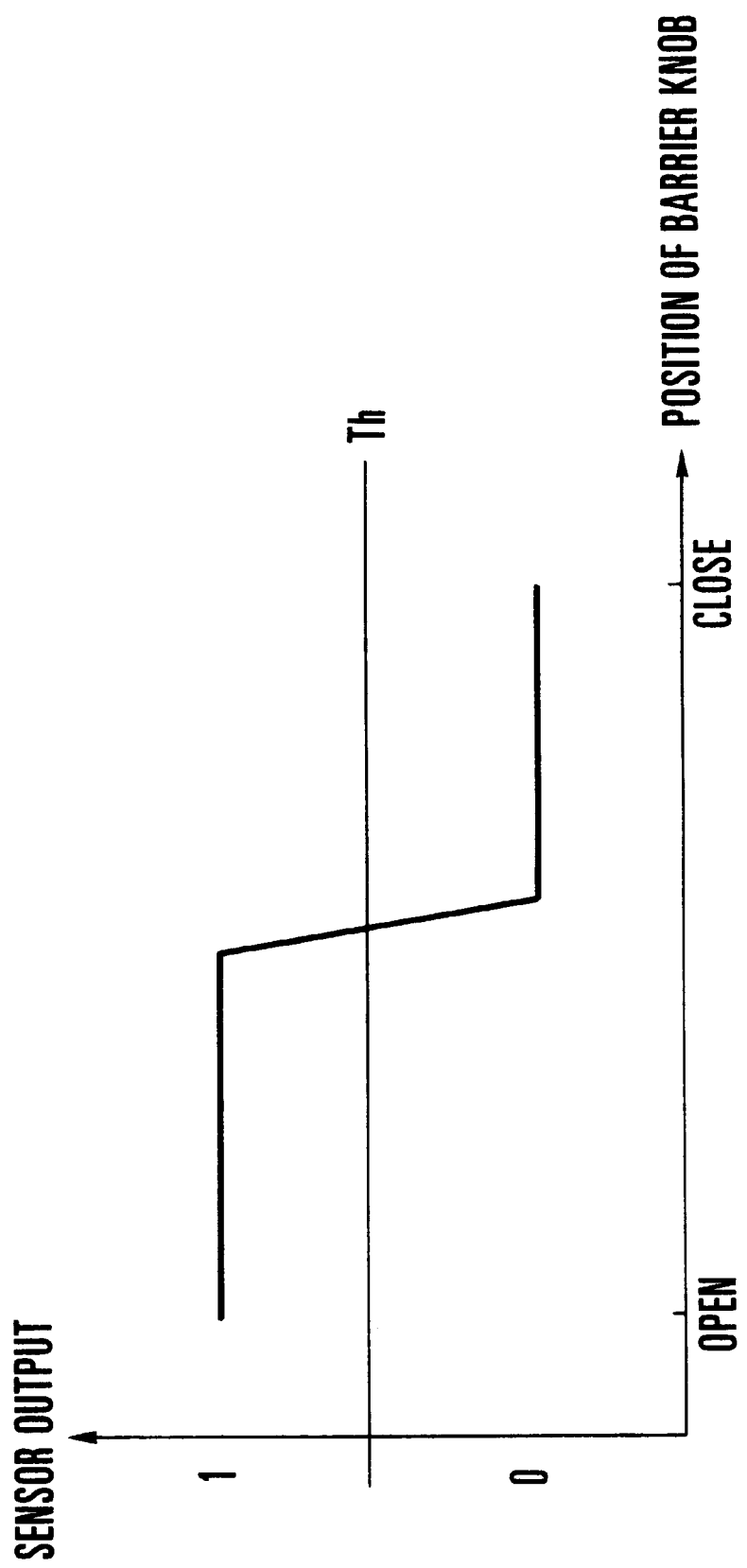
FIG. 5 is a graph showing an output of the sensor shown in FIG. 4.
Figure 19:
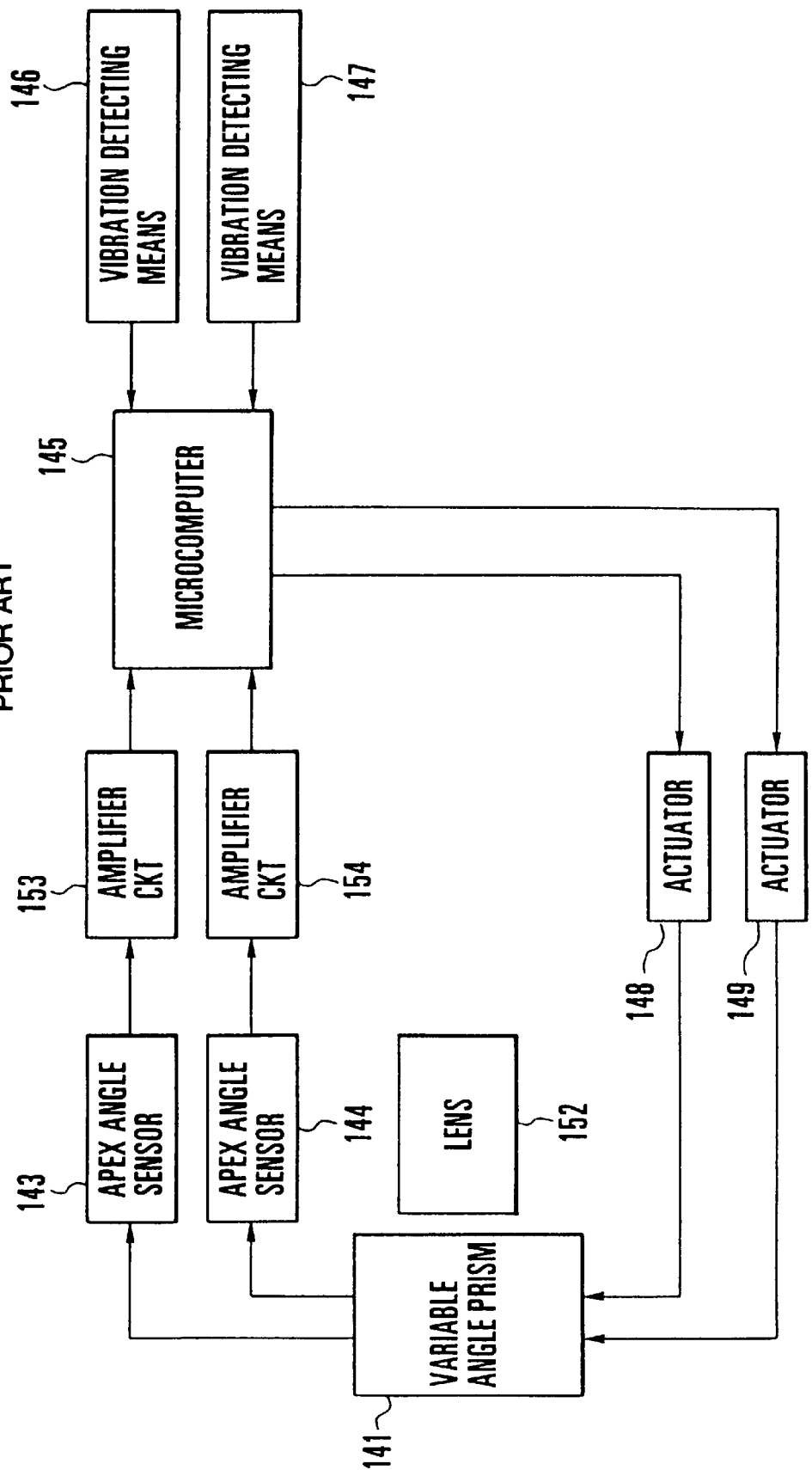
FIG. 19 is a block diagram showing the circuits of the image-shake preventing device shown in FIG. 18.

FIG. 4 shows by way of example the arrangement of a barrier position sensor, which consists of parts 18, 19 and 20. Referring to FIG. 4, a projection 18 is formed at the fore end of the lens barrier part 3. A light receiving sensor 19 is arranged to detect the position of the lens barrier part 3 in conjunction with a light projecting element 20. FIG. 5 shows in a graph the output of the light receiving sensor 19 in relation to the position of the lens barrier part 3. The position of the lens barrier part 3 is shown on the axis of abscissa and the output of the light receiving sensor 19 is shown on the axis of ordinate. The projection 18 is retracted when the lens barrier part 3 is in its open position. In this instance, the light receiving sensor 19 receives light from the light projecting element 20 as it is. The output of the light receiving sensor 19 then exceeds a threshold value "Th". This state is indicated as an output "1". When the lens barrier part 3 turns in the direction of closing an optical path, the projection 18 comes from its intermediate position to gradually cover the front of the light receiving sensor 19. Since the light from the light projecting element 20 is thus gradually blocked by the projection 18, the output of the light receiving sensor 19 drop. When the output of the light receiving sensor 19 is smaller than the threshold value "Th", that state is indicated as an output "0". The position of the lens barrier part 3 is detected in this manner. When the barrier position detecting sensor thus detects that the lens barrier part 3 is being closed, the result of detection is supplied to the microcomputer 145, which is shown in FIG. 19. In accordance with the detection, the microcomputer 145 controls the position of the variable angle prism in such a way as to bring the holding frames 128a and 128b of the variable angle prism 141 to the positions where they should be held before they are caught by the holding claws 5 and 6. After that, the holding claws 5 and 6 come to hold the variable angle prism 141.

Figure 6:
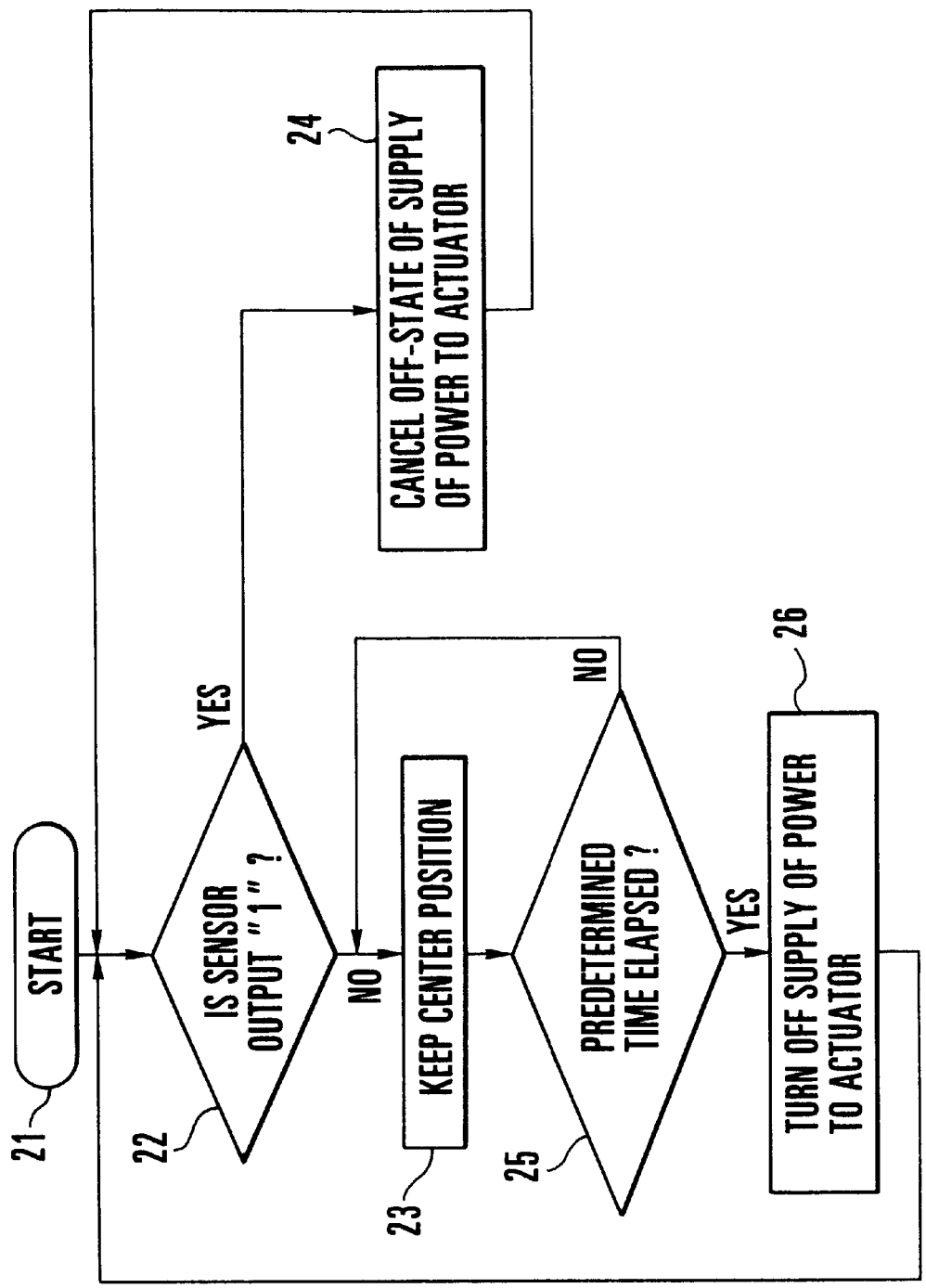
FIG. 6 is a flowchart showing procedures for a holding action of the second embodiment of this invention.

FIG. 6 is a flowchart showing only a part of the operation of the microcomputer 145 related to the processes for holding the variable angle prism 141. The flow of operation starts at a step 21. At a step 22, a check is made to find whether the output of the light receiving sensor 19 is at "1" or "0". If the output of the light receiving sensor 19 is found to be at "1" thus indicating that the lens barrier part 3 is open, the flow goes to a step 24. At the step 24, the apex angle of the variable angle prism 141 is controlled by energizing the actuators 148 and 149 according to the result of detection of vibration by the vibration detecting means 146 and 147 (or to its middle position when the image-shake preventing device is inoperative).

If the output of the light receiving sensor 19 is found at the step 22 to be at "0" thus indicating that the lens barrier part 3 is being closed, the flow goes to a step 23. At the step 23, the actuators 148 and 149 are caused to drive the variable angle prism 141 to move to the position where it should be kept (the middle point of its movable range) irrespective as to whether the image-shake preventing device is operative or inoperative. The variable angle prism 141 is maintained in that position. At a step 25, the variable angle prism 141 is kept in that position for a predetermined length of time. After the lapse of this length of time, the supply of electric power to the actuators 148 and 149 is cut off. With the predetermined length of time appositely set, the variable angle prism 141 comes to be adequately held by the holding claws 5 and 6 before the supply of electric power to the actuators 148 and 149 is cut off.

As described above, the second embodiment is arranged to perform control in such a manner that, before the holding member comes to hold the variable angle prism 141, the variable angle prism 141 is forcibly moved to a holdable position when the variable angle prism 141 is to be held by the holding member. This arrangement thus effectively prevents the variable angle prism 141 or the holding member from colliding with a wrong part to be damaged thereby, so that the variable angle prism 141 can be smoothly displaced into a holding position.

Third Embodiment

Figure 7:
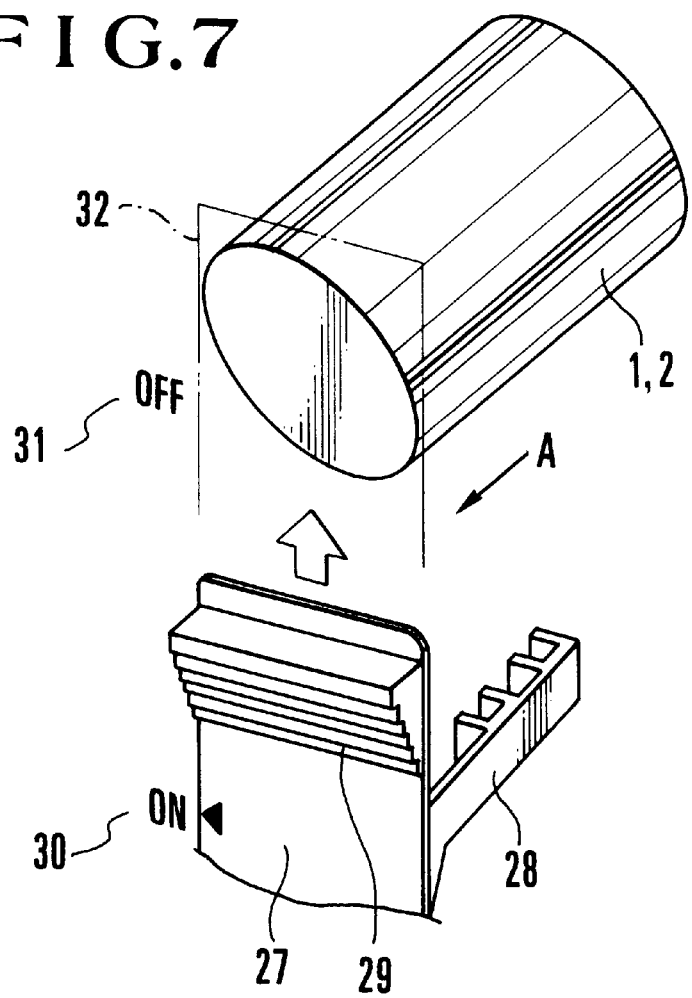
FIG. 7 is an oblique view showing a mechanism arranged in a third embodiment of this invention to interlock a slide-type lens barrier and a correcting-optical-system holding member.

In the description of the first and second embodiments of this invention, the method for interlocking the lens barrier part and the holding mechanism has been described. FIG. 7 which relates to a third embodiment, on the other hand, shows a method for interlocking the position of the lens barrier part and a main power supply. In the case of the third embodiment shown in FIG. 7, the lens barrier part is of a sliding type unlike the rotating type lens barrier of FIGS. 1 and 4.

Referring to FIG. 7, a slide barrier 27 is provided with a holding claw part 28 which is formed in one body with the slide barrier 27. The holding claw part 28 is arranged to be movable up and down and to hold the variable angle prism, when the barrier 27 is in a closed position 32, in the same way as in the case of FIG. 2(B).

Figure 8:
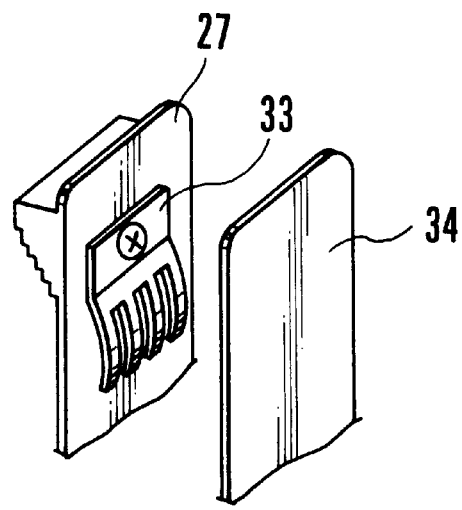
FIG. 8 is an oblique view showing a brush provided on the rear side of the slide-type lens barrier and a circuit board arranged to come into contact with the brush.
Figure 9:
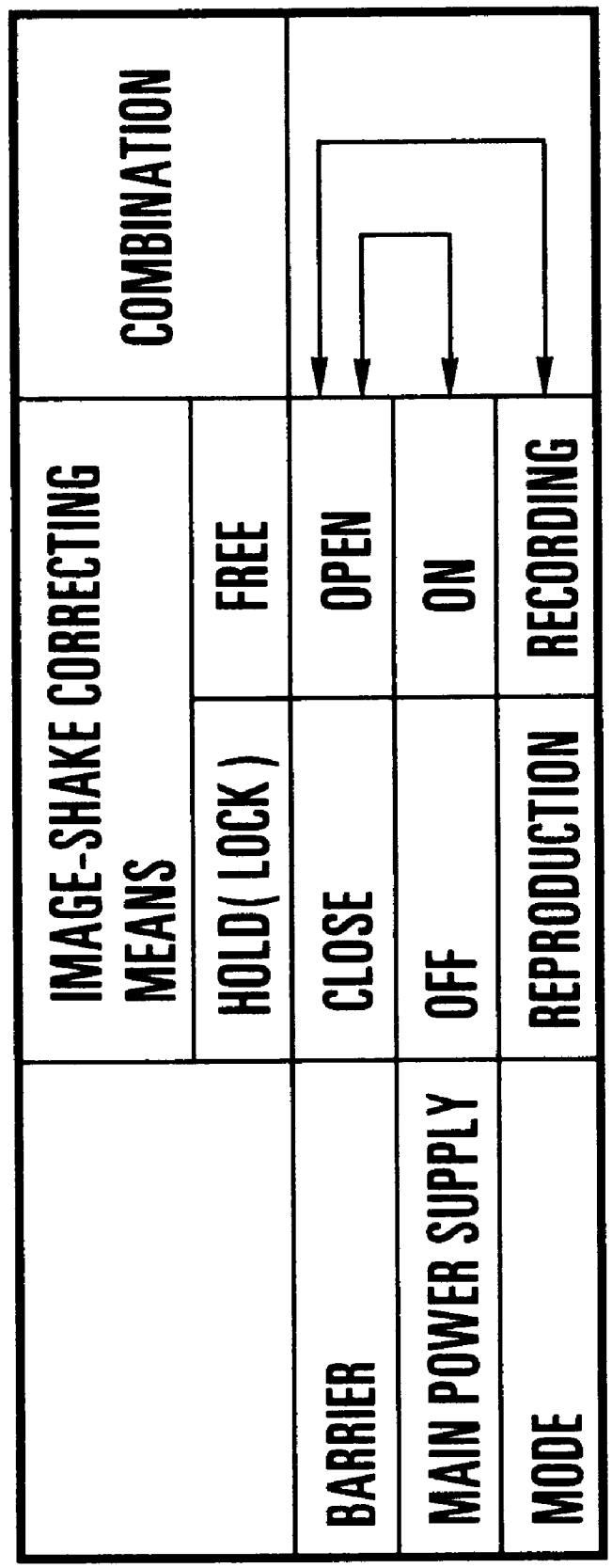
FIG. 9 is a table showing the states of holding and not holding a movable correcting optical member of image-shake correcting means in correlation with the states of other members such as, e.g., the main power supply.

Referring to FIG. 8, in this case, a brush 33 is secured to the reverse surface of the slide barrier 27 in the direction of arrow A (see FIG. 7). The brush 33 is arranged to slide over a pattern provided on a circuit board 34. With a main power supply formed jointly by the brush 33 and the circuit board 34, when the slide barrier 27 is in the closed position 32, the main power supply turns off without fail and the image-shake correcting means is held in its middle position. FIG. 9 shows this relationship in a table. In addition to the interlocked relation of the main power supply, the slide barrier 27 and the holding mechanism described above, an operation mode selection switch (for selection of a reproducing or recording mode) may be interlocked also with the slide barrier 27 and the holding mechanism as shown in FIG. 9.

In the foregoing description of embodiments, the variable angle prism has been mainly taken up by way of example as the image-shake correcting means. However, optical correcting means other than the variable angle prism may be likewise arranged.

Figure 10:
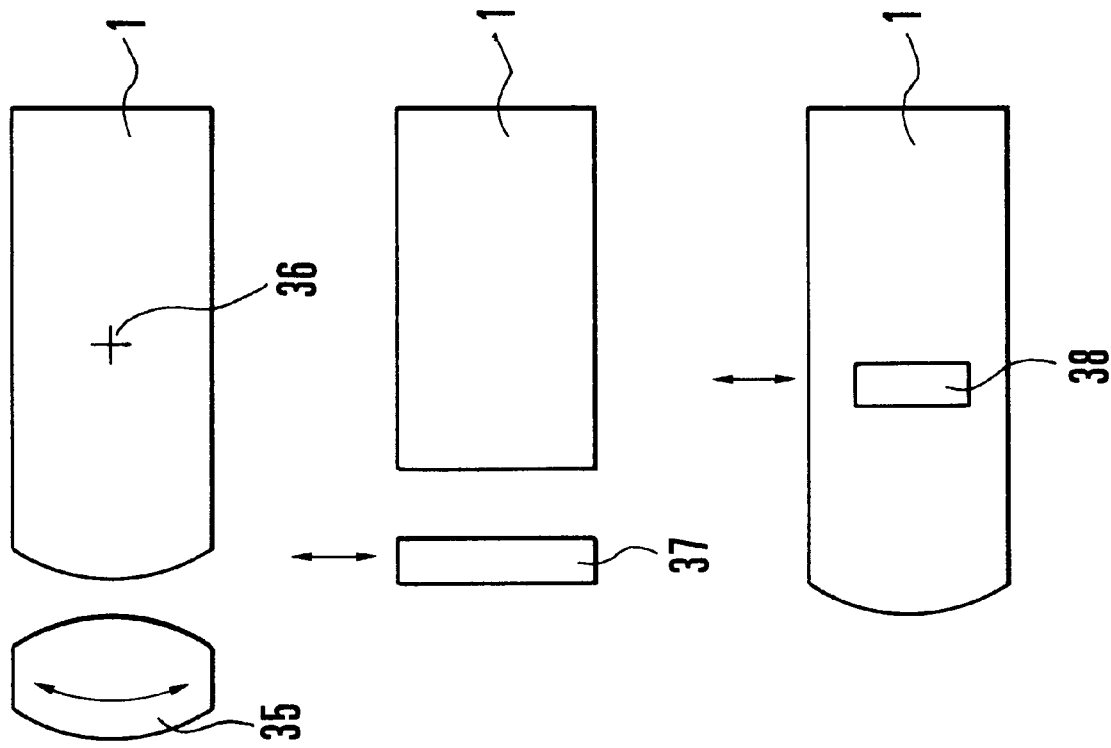
FIGS. 10(A), 10(B), and 10(C) show correcting optical means other than a variable angle prism.

For example, FIG. 10(A) shows a lens group 35 which is held by a rotating mechanism having a rotation axis 36 and which is arranged at a foremost part of a photo-taking lens 1 for the purpose of correction. In this instance, an arm or the like disposed between the rotation axis 36 and the lens group 35 can be arranged to be held in a middle position by means of holding claws in exactly the same manner as the arrangement described in the foregoing description.

FIG. 10(B) shows a correcting optical member 37 which is arranged to correct an image shake by moving approximately perpendicular to an optical axis. The optical member 37 can be also likewise arranged in the manner described in the foregoing description.

FIG. 10(C) shows another example of image-shake correcting arrangement, wherein a lens group 38, which is included in a photo-taking lens 1 is arranged to be movable. The lens group 38 also can be arranged in the same manner in accordance with this invention.

As described above, the first to third embodiments of this invention are arranged to change the state of holding the image-shake correcting optical means in association with the action of the barrier means. This arrangement solves the following problems: (i) abnormal sounds or damages caused by mechanical collision resulting from impacts and vibrations applied from outside, and (ii) degraded performance caused by habitual dislocation taking place when the variable angle prism is left under a high temperature or high moisture condition over a long period of time in a posture other than the parallel posture. It is another advantage of the embodiment that, compared with the conventional arrangement of using a motor or the like for the same purpose, the embodiment permits reduction in size and saves electrical energy.

Further, the embodiment is arranged to forcibly move the image-shake correcting optical means beforehand to a position where it can be readily held by the holding means when the state of the holding means is shifting to a state of holding the image-shake correcting means. That arrangement allows the holding means to smoothly shift to its holding state by effectively preventing the image-shake correcting optical means and the holding means from touching the wrong parts and from being thus damaged.

Fourth Embodiment

Figure 11:
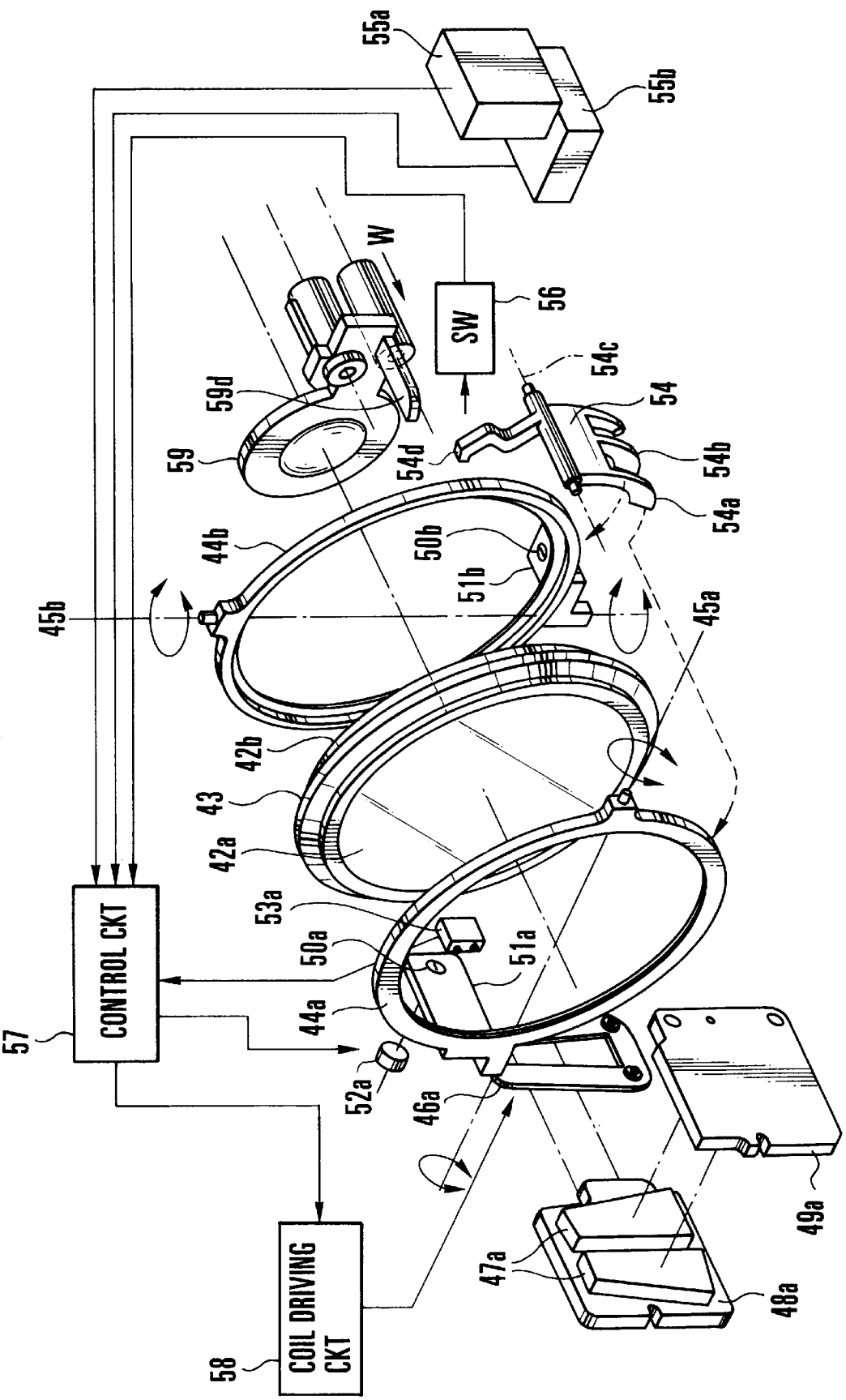
FIG. 11 is an exploded oblique view showing the mechanism of a shooting apparatus which has an image-shake correcting function and is arranged as a fourth embodiment of this invention.
Figure 12:
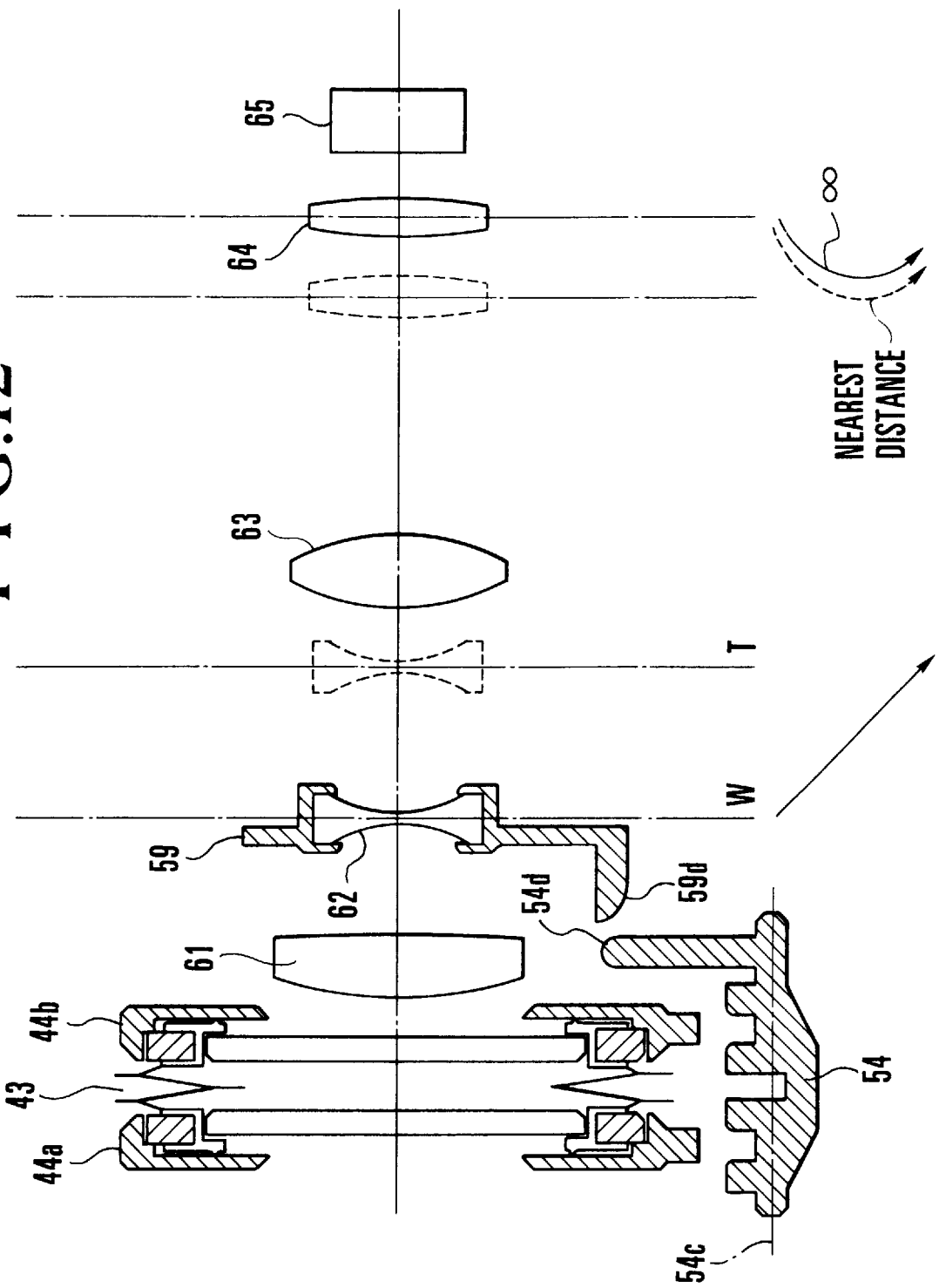
FIG. 12 is a sectional view showing parts of the shooting apparatus of FIG. 11 which has the image-shake correcting function.

FIGS. 11 and 12 show in outline the arrangement of a shooting apparatus having an image-shake correcting function and arranged as a fourth embodiment of this invention. Referring to FIG. 11, two transparent plates 42a and 42b are opposed to each other. A liquid (not shown) which has a high refractive index is tightly sealed in a space by the transparent plates 42a and 42b and a transparent film 43. A variable angle prism is formed by these parts. Frames 44a and 44b are arranged to have the variable angle prism sandwiched therebetween. The transparent plates 42a and 42b, which form parts of the variable angle prism are carried by the frames 44a and 44b in such a manner that they are rotatable around a pitch axis 45a and a yaw axis 45b. A flat type coil 46a is secured to one end of the front frame 44a. Permanent magnets 47a and yokes 48a and 49a are arranged on two sides of the coil 46a in a state of being opposed to each other. A closed magnetic circuit is formed by these parts. An arm part 51a is formed in one body with the frame 44a and is provided with a slit 50a. A light emitting element 52a which is an IRED or the like and a light receiving element 53a which is a PSD or the like and is arranged, for example, to have its output vary with the position of the spot of a received light flux, are opposed to each other across the slit 50a. A light flux emitted from the light emitting element 52a is arranged to illuminate the light receiving element 53a after passing through the slit 50a.

A lock lever 54 is arranged to lock the front and rear frames 44a and 44b in the middle point of their movable range. Vibration detectors 55a and 55b are mounted on a part (not shown) which is supporting the apparatus. The vibration detectors 55a and 55b are capable of detecting the amounts of vibrations in the directions of pitching and yawing of the apparatus as a whole. A switch 56 is arranged to turn on and off according to changes taking place in the position of the lock lever 54. A control circuit 57 controls the whole apparatus. A coil driving circuit 58 is arranged to drive the coil 46a in accordance with a driving signal coming from the control circuit 57.

Although not shown in FIG. 11, another group of parts are arranged also in the direction of yawing that correspond to the like elements in the direction of pitching, including the flat type coil 46a, permanent magnets 47a, yokes 48a and 49a, the slit 50a, the arm part 51a, the light emitting element 52a and the light receiving element 53a, and which function in the same manner as the parts arranged in the direction of pitching.

FIG. 12 shows an optical system of the fourth embodiment. The main optical system of the embodiment is of the so-called rear focus type zoom lens.

Referring to FIG. 12, a first lens group 61 is stationary. A second lens group 62 has a magnifying power varying function. A third lens group 63 is arranged to correct a shift of an image plane caused by changes in the magnifying power. A fourth lens group 64 is arranged to make focus adjustment. An image sensor 65 is a CCD or the like. A moving ring 59 shown in FIG. 11 is arranged to carry the second lens group 62 which has the magnifying power varying function.

The image-shake preventing action of the fourth embodiment, which is arranged as described above is performed as described below:

When the whole shooting apparatus including the image-shake preventing device is caused to vibrate by something like vibrations of a hand holding the apparatus, the vibration detectors 55a and 55b vibrate with the apparatus. The outputs of the vibration detectors 55a and 55b become detection signals indicating respectively the amounts of vibrations taking place around the axes 45a and 45b. These signals are inputted to the control circuit 57. At the control circuit 57, these signals are multiplied by some suitable multiplier to compute an apex angle necessary for removal of the vibrations by means of the variable angle prism.

Meanwhile, the angles of turning of the opposed transparent plates 42a and 42b around the axes 45a and 45b, i.e., changes in the apex angle of the variable angle prism (displacements from the middle point of the movable range) taking place in the pitching and yawing directions appear as shifts of light spot positions on the light receiving planes of the light receiving elements 53a and 53b which are illuminated by the light fluxes through the slits 50a and 50b provided in the arm parts 51a and 51b of the frames 44a and 44b which rotate together with the opposed transparent plates 42a and 42b. The light receiving elements 53a and 53b then form signals according to the moving extents of the light spots, i.e., the magnitudes of the apex angle of the variable angle prism and send these signals to the control circuit 57.

Upon receipt of these signals, the control circuit 57 computes a difference in magnitude between the apex angle which has been computed as mentioned above and the current apex angle. The difference thus obtained is sent as a driving instruction signal to the coil driving circuit 58 for driving the coils 46a and 46b. The coil driving circuit 58 then applies driving currents to the coils 46a and 46b according to the driving instruction signal to generate thereby a coil driving force. The variable angle prism is caused by the coil driving force to turn around the axes 45a and 45b. As a result, the angle position of the variable angle prism changes to coincide with the above-stated computed magnitude of apex angle. In other words, with an apex angle value which is computed in such a way as to correct vibrations used as a reference signal, the vibrations are corrected through feedback control by using information on the current value of apex angle as a feedback signal.

In bringing the image-shake preventing action to a stop, the fourth embodiment operates as follows:

The lock lever 54 is mounted on a support part of the apparatus (not shown) in such a way as to be turnable around the rotation axis 54c. The lock lever 54 has an engaging part 54a arranged to engage the front frame 44a and another engaging part 54b arranged to engage the rear frame 44b when the lock lever 54 turns in the direction of an arrow indicated by a broken line in FIG. 11. The variable angle prism is locked at the middle point of its movable range when the lock lever 54 turns in this direction.

For causing the lock lever 54 to turn around the axis 54c, the moving ring 59 is moved toward a wide-angle end position in the direction of an arrow W, as shown in FIG. 11. When the moving ring 59 moves further toward the wide-angle end position from a normal shooting area, a protrudent engaging part 59d of the moving ring 59 comes to slidingly engage a protrudent engaging part 54d of the lock lever 54 to cause the lock lever 54 to turn in the direction of the arrow indicated by the broken line.

Figure 13:
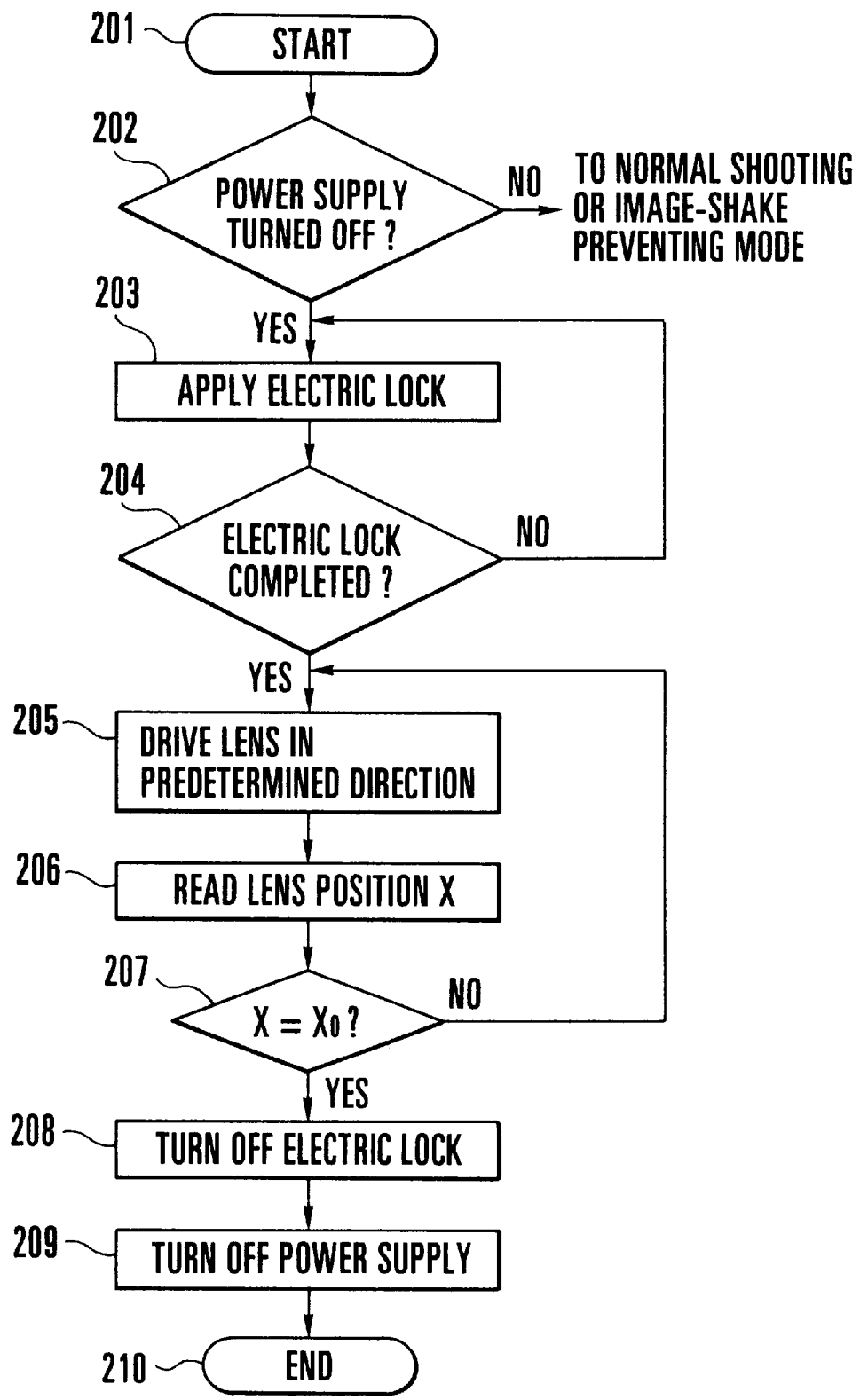
FIG. 13 is a flowchart showing the actions of parts of the shooting apparatus of FIG. 11 having the image-shake correcting function.

FIG. 13 is a flowchart showing the actions of parts of the above-stated arrangement of the shooting apparatus having the image-shake correcting function. The actions of these parts are described below with reference to the flowchart of FIG. 13.

When a power supply is turned on for the image-shake preventing device, the device begins to carry out steps 202, etc., through a step 201. Step 202: A check is made to find if the power supply is turned off. If so, the flow of operation proceeds to a step 203. If not, the flow comes to a normal shooting or image-shake preventing mode. Step 203: Since the power supply is turned off, currents are supplied from the coil driving circuit 58 to the coils 46a and 46b to cause the frames 44a and 44b to come to the middle points of their movable ranges. Step 204: Signals outputted from the light receiving elements 53a and 53b are checked to find if the frame 44a or 44b is in the middle point of its movable range. If not, the flow goes back to the step 203 to repeat the above-stated step 203. If so, an electric lock is considered to have been applied and the flow proceeds to a step 205. Step 205: The moving ring 59 is driven to move in a predetermined direction (toward the wide-angle end position, in the case of this embodiment).

Step 206: The position X of the moving ring 59 is read. Step 207: A check is made to find if the moving ring 59 has come to a predetermined position X0. If not, the flow goes back to the step 205 to repeat the same step. After that, when the moving ring 59 is found to be at the predetermined position X0, the flow comes to a step 208. By this step, the engaging part 59d of the moving ring 59 is caused to come into sliding contact with the engaging part 54d of the lock lever 54. The lock lever 54 is caused to turn in the direction of the arrow indicated by a broken line in FIG. 11. A mechanical lock is thus applied by the lock lever 54. Step 208: The supply of currents to the coils 46a and 46b is cut off to cancel out the electric lock. Step 209: The power supply for the whole apparatus is turned off. Step 210: A series of actions described above comes to an end.

The fourth embodiment described above is thus arranged to lock the variable angle prism by causing the lock lever 54 to turn by the moving ring 59 which is provided for holding and moving a moving optical system of the main optical system of the image-shake preventing device when the operator of the apparatus gives a signal for turning off the power supply for the whole apparatus. The arrangement, therefore, makes it possible to lock the variable angle prism without recourse to a motor, etc., for example, which are otherwise necessary solely for the purpose of locking the variable angle prism.

In a case where the operator inadvertently removes a battery and then again mounts the battery while a shooting operation is still in process, the embodiment operates as follows: After the battery is mounted again, a check is made for the current mode of the apparatus. The apparatus is assumed to have three modes including a shooting mode, a video mode, and a stop mode. If the apparatus is found to be in the shooting mode, the flow of control operation proceeds to the normal shooting or image-shake preventing mode. In the case of the video mode or the stop mode, the flow comes to execute the steps beginning with the step 203.

Fifth Embodiment

Figure 14:
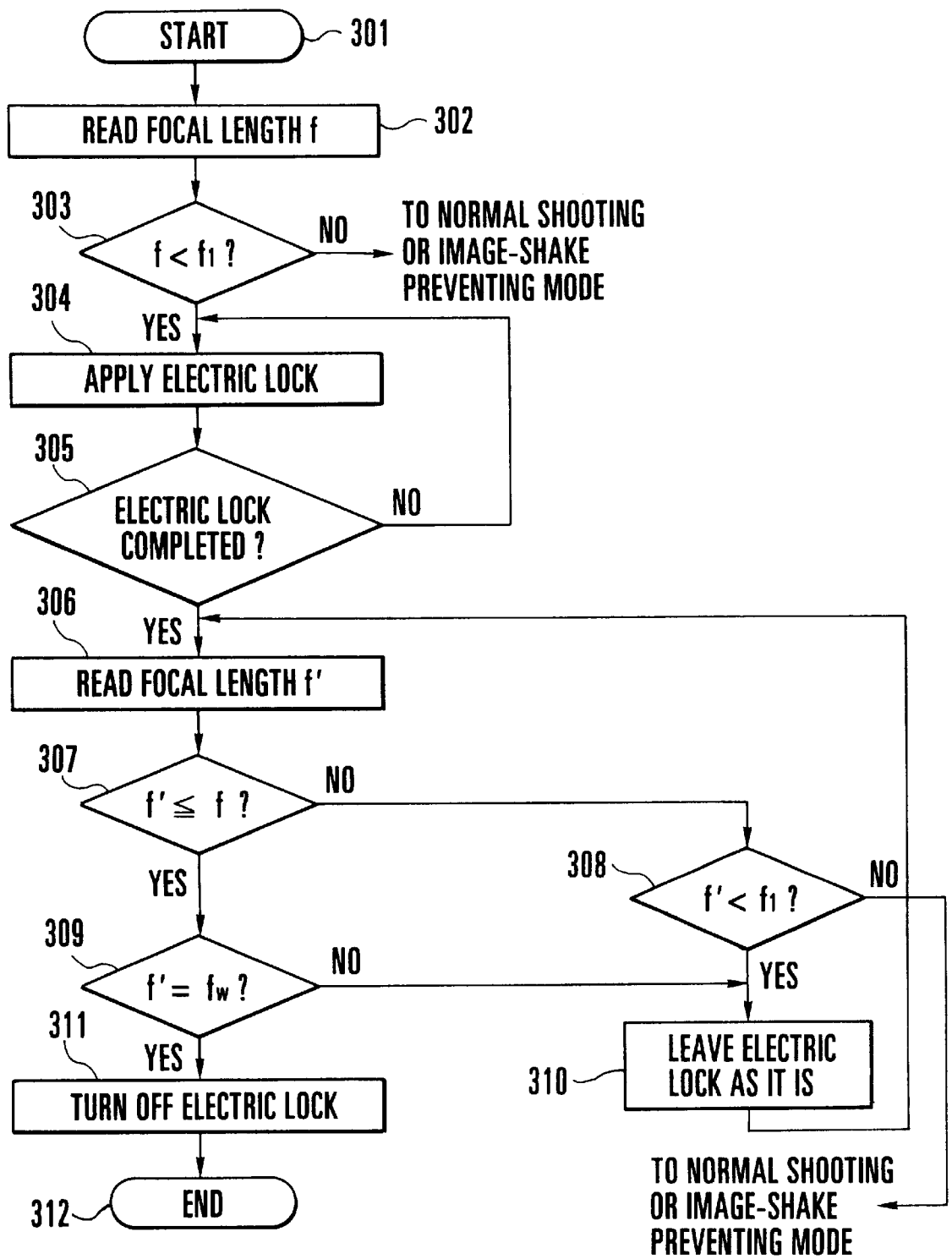
FIG. 14 is a flowchart showing the actions of parts of a shooting apparatus which has an image-shake correcting function and is arranged as a fifth embodiment of this invention.
Figure 15A:
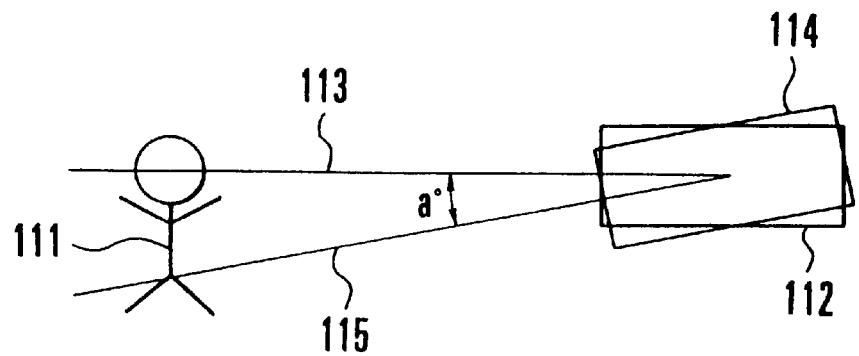
FIGS. 15(A), 15(B), and 15(C) show a relation obtained in general between a focal length and the angle of vibration of a camera through the position of an object image obtained on an image plane.
Figure 15B:
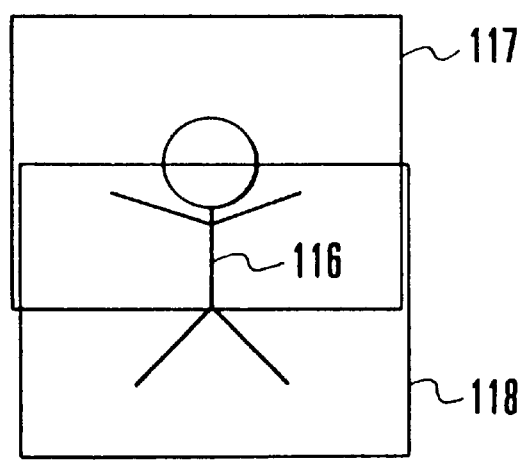
Figure 15C:
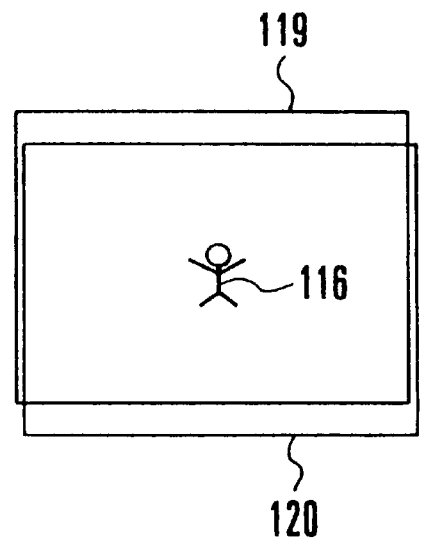
Figure 16A:
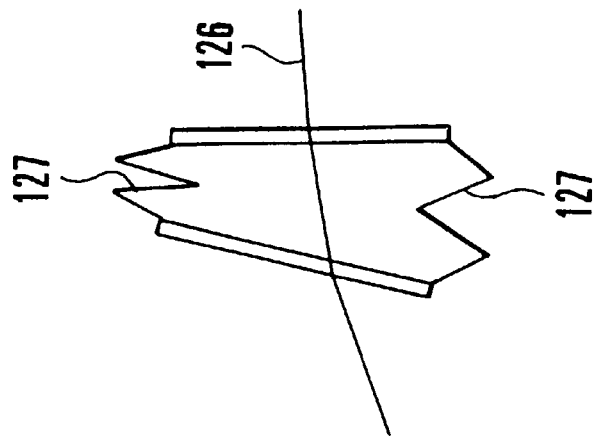
FIGS. 16(A), 16(B), and 16(C) show in outline the arrangement of a variable angle prism generally employed.
Figure 16B:
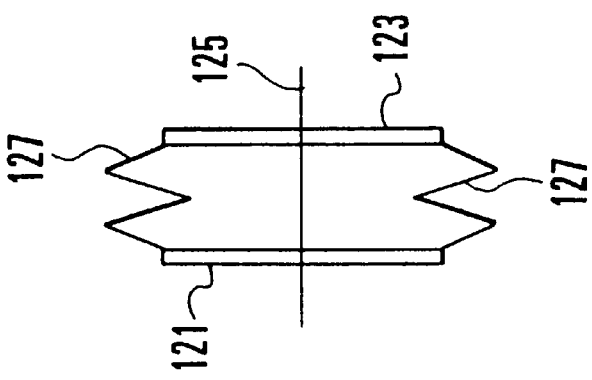
Figure 16C:
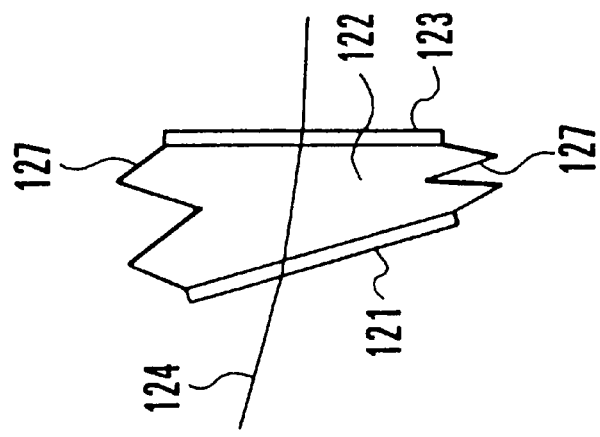
Figure 18:
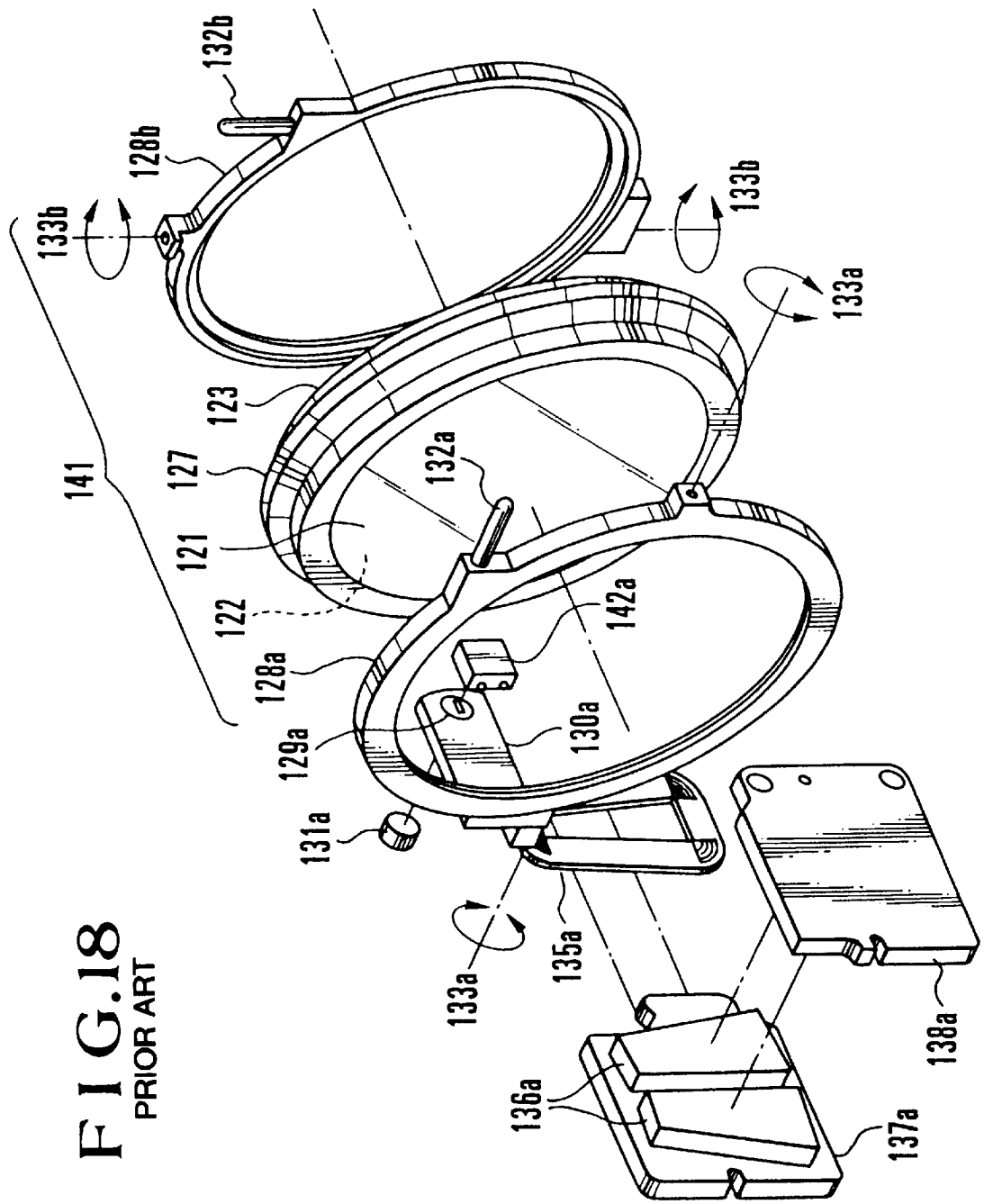
FIG. 18 is an oblique view showing in outline the arrangement of an image-shake preventing device having the variable angle prism shown in FIGS. 16(A), 16(B) and 16(C) as image-shake correcting means.

FIG. 14 is a flowchart showing the actions of the essential parts of a shooting apparatus having an image-shake correcting function arranged as the fifth embodiment of this invention. The circuit arrangement and the mechanical arrangement of the fifth embodiment are identical with those of the fourth embodiment and are, therefore, omitted from the following description.

At a step 301, when a power supply for the image-shake preventing device is turned on, the flow of operation of the embodiment begins to execute steps from a step 302. Step 302: The current focal length f of a magnifying power varying optical system which is a main optical system is read. Step 303: The focal length f read at the step 302 is compared with a predetermined value f1. The comparison is made, because the effect of an image-shake preventing action is not clear when a focal length is less than a certain value (the predetermined value f1). The image-shake preventing action is, therefore, not necessary in a case where the focal length is less than the predetermined value f1. If the focal length f is found to be less than the predetermined value f1 at the step 303, the flow goes to a step 304. If not, the flow goes to a normal image-shake preventing mode as the image-shake preventing effect is attainable.

Step 304: A current is applied from the coil driving circuit 58 to each of the coils 46a and 46b in such a way as to bring the frame 44a or 44b to the middle point of its movable range. Step 305: A signal outputted from each of the light receiving elements 53a and 53b is checked to find if the frame 44a or 44b is in the middle point of its movable range. If not, the flow goes back to the step 304 to repeat the same step. If so, the application of the electric lock is considered to have been completed, and the flow proceeds to a step 306.

Step 306: The current focal length f' is read. Step 307: The current focal length f' is compared with the focal length f read at the step 302. If the value of the focal length f' is found to be larger than that of the focal length f, the flow comes to a step 308. If not, the flow goes to a step 309. Step 308: The focal length f' is compared with the predetermined value f1. If the value of the focal length f' is found to be smaller than the predetermined value f1, the flow comes to a step 310. If not, the flow proceeds to the normal image-shake preventing mode, because the image-shake preventing action is necessary. Step 309: A check is made to find if the focal length f' is equal to a second predetermined value fw (which corresponds to a wide-angle end position). If so, the flow goes to a step 311. If not, the flow comes to a step 310. Step 310: The current is continuously applied to each of the coils 46a and 46b. The flow then goes back to the step 306 to repeat the steps mentioned above. Step 311: The supply of a current to each of the coils 46a and 46b is brought to a stop. The fact that the current focal length f' is equal to the second predetermined value fw means that the engaging part 54d of the lock lever 54 has come into sliding contact with the engaging part 59d of the moving ring 59, and the lock lever 54 turns in the direction of the arrow indicated by the broken line in FIG. 11. Since the mechanical lock is thus applied by the lock lever in this instance, the application of the electric lock is canceled. Step 312: The flow of operation including the series of actions mentioned above comes to an end.

The fifth embodiment described above is arranged to consider an area in the neighborhood of the wide-angle end position to be requiring no image-shake preventing action, because no salient effect of the image-shake preventing action is attainable there. In the neighborhood of the wide-angle end position, therefore, the electric lock is gradually applied in such a way as to allow the lock lever 54 to completely lock the variable angle prism at the wide-angle end position. The arrangement is such that the variable angle prism can be locked without recourse to a motor otherwise necessary solely for purpose of locking the variable angle prism.

According to the arrangement of the fourth and fifth embodiments, the lock lever 54, which is a locking means, comes to act in association with the moving ring 59, which holds and moves a moving optical system when the movement of the moving ring 59 comes to a predetermined position (a predetermined focal length for normal shooting, i.e., the predetermined value f1 in the case of the embodiment). The lock lever 54 then acts to lock the variable angle prism which is employed as correcting optical means. In other words, the lock lever 54 is arranged to be operable by using an existing member without newly providing an additional member solely for the purpose of operating the lock lever 54. The arrangement thus permits reduction in the size and cost of the apparatus.

As described above, in each of the fourth and fifth embodiments, the holding means for holding the magnifying power varying optical system is provided with an engaging part. The engaging part is arranged to vary the state of lock means for locking the correcting optical means between a state of not locking and a state of locking the correcting optical means to the middle point of its movable range. The state of the lock means is thus arranged to vary in association with the movement of the holding means which holds the magnifying power varying optical system. Therefore, the arrangement described above permits reduction in size and cost of the apparatus.

What is claimed is:

1. An apparatus adapted to an image-shake prevention apparatus for use with a camera settable in an image recording mode and a reproducing mode and having a closable barrier which covers an optical system, the image shake prevention apparatus including a movable member disposable along an optical axis and preventing image-shake by movement of the movable member in a direction different from the optical axis and having a restriction device which restricts movement of the movable member, the apparatus comprising:

a control device which causes the restriction device to perform a restriction operation and causes the closable barrier to close when the camera is set in the reproducing mode.

2. An apparatus according to claim 1, wherein said restriction device includes means for restricting movement of said movable member by causing the movable member to come into a non-movable state by mechanical action.

3. An apparatus according to claim 1, wherein said restriction device includes means for restricting the movement of the movable member by contact with the movable member.

4. An apparatus according to claim 1, wherein said control device includes means for releasing restriction by the restriction device in response to the setting of the camera in the image recording mode.

5. An apparatus according to claim 1, wherein said control device includes means for bringing the closable barrier into an open state in response to the setting of the camera in the image recording mode.

6. An apparatus according to claim 1, wherein said restriction device includes means for fixing the movable member.

7. An apparatus according to claim 1, wherein the movable member includes an optical member.

8. An apparatus according to claim 7, wherein the movable member includes means for deflecting a light flux.

9. An apparatus according to claim 7, wherein the movable member includes a variable-angle prism.

10. An apparatus according to claim 1, wherein the closable barrier includes means for covering a photographing optical system of the camera.

11. An image shake prevention apparatus for use with a camera settable in an image recording mode and a reproducing mode and having a closable barrier which covers an optical system, the image shake prevention apparatus comprising:

a movable member disposable along an optical axis and movable in a direction different from the optical axis to prevent image-shake;

a restriction device which restricts movement of the movable member; and a control device which causes the restriction device to perform a restriction operation and causes the closable barrier to close when the camera is set in the reproducing mode.

12. A camera settable in an image recording mode and a reproducing mode and usable with an image-shake prevention device including a movable member disposable along an optical axis and in which image-shake is prevented by movement of the movable member in a direction different from the optical axis and which has a restriction device which restricts movement of the movable member, the camera comprising:

a closable barrier which covers an optical system; and a control device which causes the restriction device to perform a restriction operation and causes the closable barrier to close when the camera is set in the reproducing mode.

13. A camera settable in an image recording mode and a reproducing mode, the camera comprising:

a closable barrier which covers an optical system;

a movable member disposable along an optical axis and movable in a direction different than the optical axis to prevent image-shake;

a restriction device which restricts movement of the movable member; and a control device which causes the restriction device to perform a restriction operation and causes the closable barrier to close when the camera is set in the reproducing mode.

14. An image shake prevention apparatus for use with a camera settable in an image recording mode and a reproducing mode and having a closable barrier which covers an optical system, the apparatus comprising:

a light flux polarizing portion that includes a movable optical member disposable in an optical path and which polarizes a light flux by changing a position of said movable optical member in the optical path so as to prevent image shake;

a restriction device which restricts movement of said movable optical member; and a control device which causes the restriction device to perform a restriction operation and causes the closable barrier to close when the camera is set in the reproducing mode.

15. A camera settable in an image recording mode and a reproducing mode and usable with an image-shake prevention device including a movable optical member disposable along an optical axis and in which image shake is prevented by moving the movable optical member to polarize a light flux along the optical path and which has a restriction device which restricts movement of the movable optical member, the camera comprising:

a closable barrier which covers an optical system; and a control device which causes the restriction device to perform a restriction operation and causes the closable barrier to close when the camera is set in the reproducing mode.

16. A camera settable in an image recording mode and a reproducing mode, the camera comprising:

a closable barrier which covers an optical system;

a light flux polarizing portion that includes a movable optical member disposable along an optical path and which polarizes a light flux by changing a position of said movable optical member in the optical path so as to prevent image shake;

a restriction device which restricts movement of said movable optical member; and a control device which causes the restriction device to perform a restriction operation and causes the closable barrier to close when the camera is set in the reproducing mode.

\* \* \* \* \*

UNITED STATES PATENT AND TRADEMARK OFFICE
CERTIFICATE OF CORRECTION

PATENT NO. : 6,016,221

DATED : January 18, 2000

INVENTOR(S): NAOYA KANEDA, ET AL.

It is certified that error appears in the above-identified patent and that said Letters Patent is hereby corrected as shown below:

[57] ABSTRACT:

Line 12, "adequate" should read --adequately--.

COLUMN 1:

Line 17, "lenses" should read --lens--.

COLUMN 2:

Line 3, "case" should read --case of--.

COLUMN 3:

Line 11, "direction. Each" should read --direction, each--.
Line 39, "129b" should be deleted.
Line 44, "from" should read --frame--.
Line 45, "frame" should read --from--.

COLUMN 4:

Line 16, "an" should read --a--.

UNITED STATES PATENT AND TRADEMARK OFFICE
CERTIFICATE OF CORRECTION

PATENT NO. : 6,016,221

DATED : January 18, 2000

INVENTOR(S): NAOYA KANEDA, ET AL.

It is certified that error appears in the above-identified patent and that said Letters Patent is hereby corrected as shown below:

COLUMN 5:

Line 22, "system" should read --system is--.

COLUMN 7:

Line 55, "drop" should read --drops--.

COLUMN 9:

Line 39, "then" should read --than--.

COLUMN 10:

Line 27, "are" should read --is--.
Line 28, "correspond" should read --corresponds--.
Line 32, "function" should read --functions--.

UNITED STATES PATENT AND TRADEMARK OFFICE
CERTIFICATE OF CORRECTION

PATENT NO. : 6,016,221

DATED : January 18, 2000

INVENTOR(S): NAOYA KANEDA, ET AL.

It is certified that error appears in the above-identified patent and that said Letters Patent is hereby corrected as shown below:

COLUMN 12:

Line 64, "goes" should read --proceeds--.

COLUMN 13:

Line 20, "comes" should read --goes--.

Signed and Sealed this

Fifteenth Day of May, 2001

Attest:

NICHOLAS P. GODICI

Attesting Officer        Acting Director of the United States Patent and Trademark Office